United States Patent Office 2,958,315
Patented Nov. 1, 1960

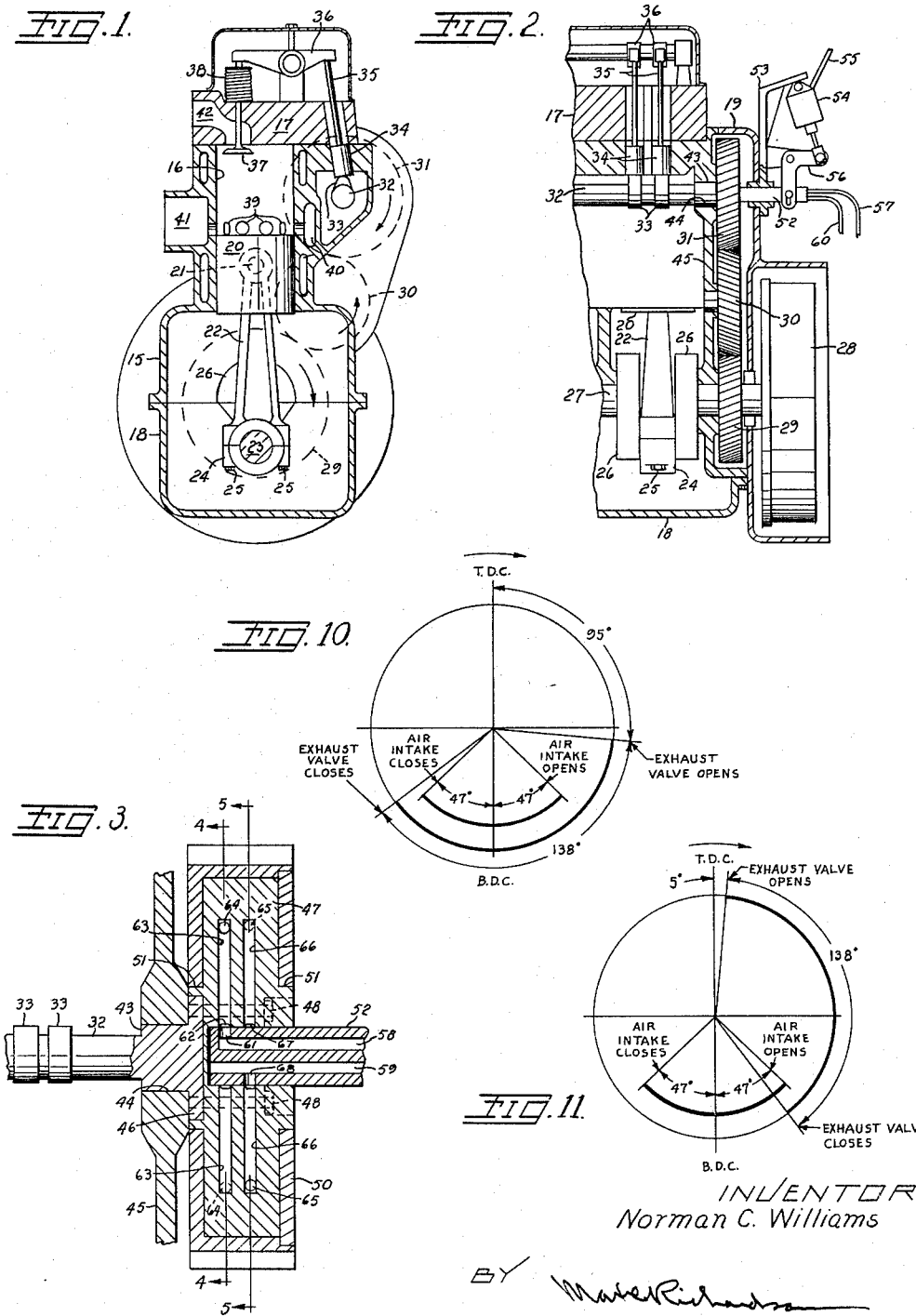

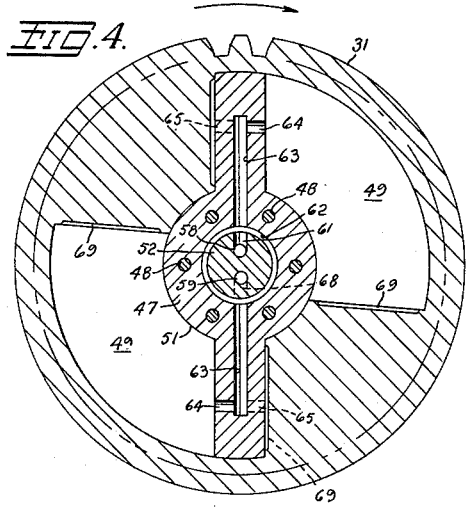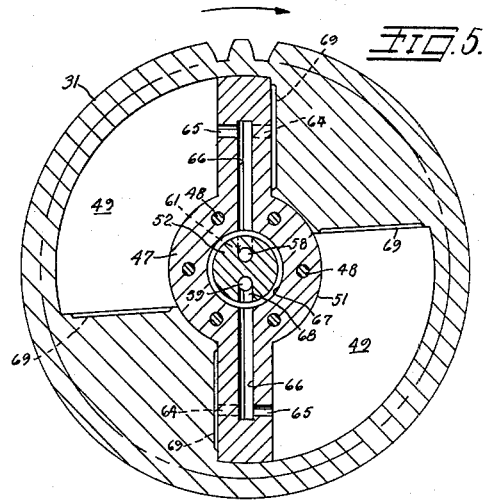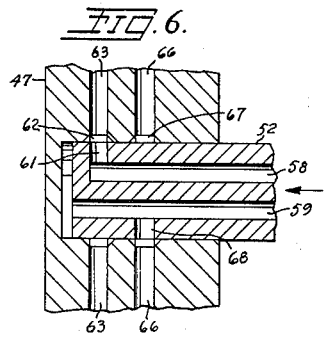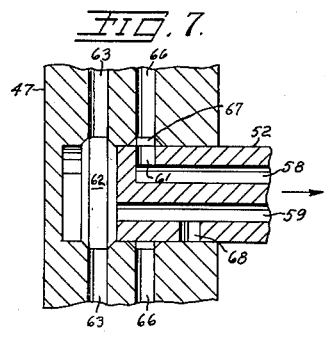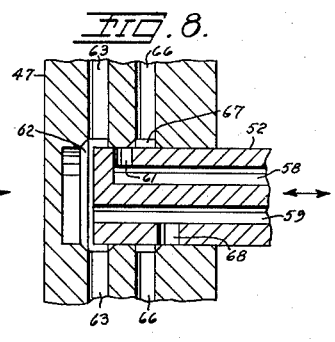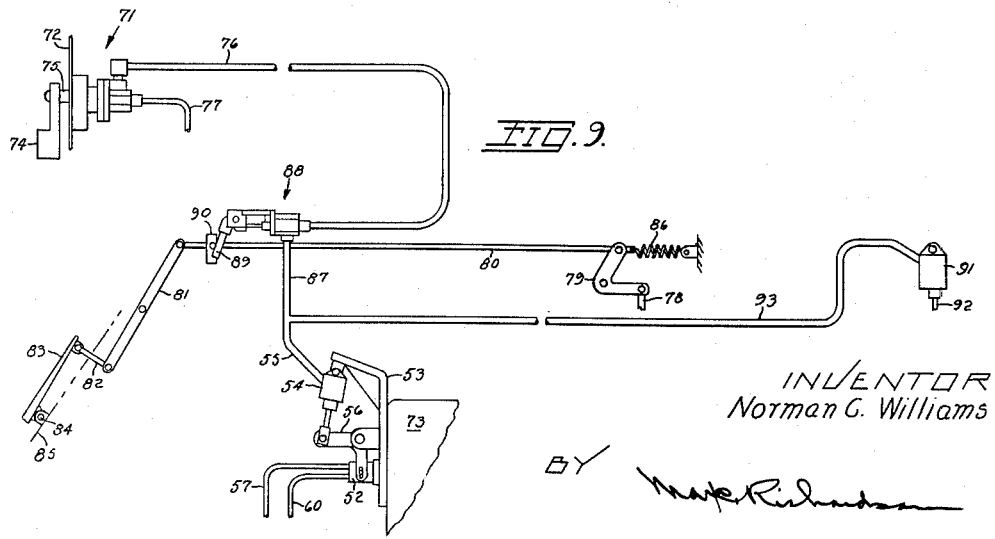

2,958,315

TWO STROKE CYCLE ENGINE BRAKE

Norman C. Williams, Portland, Oreg., assignor to Power Brake Equipment Company, a corporation of Oregon Filed May 18, 1959, Ser. No. 813,887

10 Claims. (Cl. 123—65)

This invention relates generally to compression brakes for internal combustion engines and more particularly to a compression brake for a two stroke cycle engine.

Compression brakes for four stroke cycle internal combustion engines are well known as comprising means for at least partially blocking the outlet from the exhaust manifold to atmosphere and opening the inlet manifold to atmosphere while little or no fuel is fed to the engine. This operation causes the engine to operate as an air compressor to absorb energy from its main shaft and waste the energy as heat given off by the engine and the air compressed by the engine.

However for arranging the two stroke cycle engine as a brake or energy absorber it is necessary to advance the open position of the exhaust valves in the time cycle of the engine.

It is the object of this invention to provide a method and a means for adapting a two cycle internal combustion engine to operate as a compression brake.

It is a second object to provide for a two cycle internal combustion engine, applied to an over the road automotive vehicle, a method and a means for adapting the engine to operate as a compression brake for the engine to retard the motion of the vehicle.

The method and means of these and other objects will be made plain in the following explanation referring to the attached drawings in which Fig. 1 is a fragmental sectional elevation through a two stroke cycle internal combustion engine.

Fig. 2 is a fragmental elevation in partial section viewed from the right hand side of Fig. 1.

Fig. 3 is an enlarged fragmental view in partial vertical section through the cam shaft and cam shaft gear of Fig. 2.

Fig. 4 is a vertical section along the line 4—4 of Fig. 3.

Fig. 5 is a vertical section along the line 5—5 of Fig. 3.

Fig. 6 is a view of an enlarged center fragment of Fig. 3 showing the cam shifting rod of this invention shifted to the left, in which position the engine is running as a driver.

Fig. 7 is a view similar to Fig. 6 but with the cam shifting rod shifted to the right in which position the engine is running as a compression brake.

Fig. 8 is a view similar to Fig. 6 but with the cam shifting rod positioned intermediate its positions shown in Figs. 6 and 7.

Fig. 9 is an essentially schematic view in elevation of a preferred pneumatic system of controlling the brake applying means of Figs. 3 to 8.

Fig. 10 is a valve cycle diagram of the engine when operating as an engine.

Fig. 11 is a valve cycle diagram of the engine when operating as a compression brake.

Like reference numerals refer to like parts in the several figures of the drawings.

Referring now to Figs. 1 and 2 of the drawings a hollow engine frame 15 formed with a vertical piston receiving cylinder bore 16 therethrough is seen to be closed at its top with a cylinder head 17, at its bottom with a crank case 18 and over its rearward end with a timing gear cover 19.

Piston 20 in cylinder bore 16 is rotatably supported by pin 21 on piston rod 22, the other end of which is rotatably secured by bearing cap 24 and screws 25 on crank shaft 23 formed between crank arms 26 on main shaft 27, to which are secured fly wheel 28 and timing gear 29, which through idler gear 30 drives cam shaft gear 31 in the same direction and at synchronous speed with gear 29 since gears 29 and 31 have the same pitch diameters and the same number of teeth.

Assuming that cam shaft gear 31 is secured to cam shaft 32 so that exhaust cams 33 will operate exhaust cam followers 34, follower rods 35 and rocker arms 36 to hold open exhaust valves 37 against the closing bias of springs 38, then as shown in the time cycle of Fig. 10, the engine would produce power as normally intended.

Referring to Fig. 10, the outer circle represents the time position of crank shaft 23 as seen in Fig. 1 where crank shaft 23 is shown at bottom dead center indicated by B.D.C. on Fig. 10. Going clockwise as indicated on Figs. 1 and 10 when crank shaft 23 gets to the high point of its rotation both it and piston 20 will be at the tops of their movements or at top dead center (T.D.C.) as shown in Fig. 10. And since gears 29 and 31 run in the same direction at synchronous speeds cam shaft 32 will have a T.D.C. position which it reaches at the same time as does piston 20 and cam shaft 23. Then for normal operation as an engine, valve circle diagram, Fig. 10, shows that cams 33 must be of such contour and angular position on cam shaft 32 that exhaust valves 37 must open at 95 degrees after piston 20 is at T.D.C. and close 138 degrees later.

In the same cyclic operation it is seen in Fig. 10 that the air intake ports must be uncovered from 47 degrees before B.D.C. to 47 degrees after B.D.C. The air intake ports are shown in Fig. 1 as a belt of holes 39 formed in the cylinder wall from bore 16 to intersect an inlet air tunnel 40 formed in the cylinder wall and having an enlarged inlet 41 to receive combustion air under pressure. Air ports 39 are uncovered by piston 20 while crank shaft 23 travels 47 degrees each side of B.D.C. as shown by Fig. 10 which now shows that when the engine is running as an engine and as shaft 23 travels clockwise from T.D.C. the injected fuel and compressed air is fired near T.D.C. and exerts the full power of expansion for 95° at which time the exhaust valves 37 start exhausting the spent gases of combustion from cylinder bore 16 through exhaust port 42. Then as piston 20 comes within 47 degrees of B.D.C. piston 20 will open ports 39 for 94 degrees of travel to allow new air under pressure to enter bore 16 through inlet 41, tunnel 40 and ports 39 first to scavenge products of combustion and then to fill the cylinder with new air. Shortly thereafter the exhaust valves close and for the remaining 127 degrees of the cycle the upward travel of piston 20 compresses the combustion air for the power part of the next cycle beginning near T.D.C.

Fig. 11 shows that the power part of the cycle of the two stroke cycle engine can be eliminated when it is desired to run the engine as a compressor, or power absorber, or power waster, or engine brake. To do this it is only necessary to advance the opening of the exhaust valves to as near T.D.C. as the position of piston 20 will allow the exhaust valves 37 to open. This is shown in Fig. 11 to be about 5 degrees after T.D.C. In the engine cycle of Fig. 10, during the last 127 degrees of the cycle the piston is compressing new combustion air so that at T.D.C. combustion can start and the first 95 degrees of the next cycle will be the power stroke. But in the brake cycle of Fig. 11 the exhaust valves or the inlet air ports are open from 5 degrees to 227° and the upward stroke of the piston from 227° to T.D.C. or a total of 133° is the compression or power absorbing stroke. There can be no power stroke with the advanced position of the exhaust valves for either the exhaust valves or the intake valves are open during substantially the entire down stroke of the piston.

From the above discussion it is plain that to operate a two stroke cycle engine alternately as an engine or as a brake it is necessary to be able to shift the angular position of cam shaft 32 with respect to mainshaft 27 to give the exhaust valves 37 the alternate opening positions with respect to T.D.C. as shown in Figs. 10 and 11.

In a preferred form, here shown, in which this invention may be practiced, the angular position of cam shaft gear 31 is always fixed with respect to mainshaft 27 by gears 29 and 30 and the angular position of cam shaft 32 with respect to gear 31 may be shifted from the driving engine requirement shown in Figs. 3, 4, 6 and 10 to the braking engine requirement shown in Figs. 5, 7 and 11.

In Figs. 3, 4 and 6, it is seen that cam shaft 32 is formed with a journal surface 43 rotatably supported in a bearing bore 44 formed through the wall 45 of frame 15. To the flat head end 46 of cam shaft 32 the rotary piston structure 47 is secured by screws 48 as shown. One face of cam shaft gear 31 has a pair of rotary piston receiving cavities 49 sunk therein and covered by cover plate 50 secured to gear 31 by screws, not shown. Journal surface 51 rotatably supports gear 31 and its cover plate 50 thereon.

Slide valve rod 52 is seen in Fig. 2 to be longitudinally slidably supported in bracket 53 secured to gear cover 19 of engine frame 15. Pneumatic operating cylinder 54 hung on bracket 53, when actuated by air under pressure from pipe 55 operates bell crank 56 to move valve rod 52 between its positions shown in Figs. 6 and 7.

Oil under pressure from any available source, like the engine lubricating system, not shown, is continuously applied to oil pressure tube 57 connected to the upper oil conduit 58 in rod valve 52. Exhaust oil under low pressure is returned to the oil supply sump through the lower oil conduit 59 and low pressure tube 60. Figs. 3, 4 and 6 show that when valve rod 52 is in the position of Figs. 3 and 6, oil under pressure in conduit 58 will flow from port 61 into the annular groove 62 formed in the bore of piston 47, then radially outwardly through the diametrically opposite channels 63 in piston 47 and out through the clockwise directed (Fig. 4) ports 64 into the diametrically disposed cylinder cavities 49 of gear 31. The oil pressure building up in cylinder spaces 49, ahead of the two ends of piston 47 presses piston 47 counterclockwise with respect to gear 31 and squeezes the oil in cavities 49 on the counterclockwise sides of piston 47 out through ports 65 channels 66 and groove 67 of piston 47 to port 68 and conduit 59 to low pressure oil tube 60, thus holding cam shaft 32 in its most retarded position with respect to gear 31 which is the required angular relation of cam shaft 32 to gear 31 for the engine to run as an engine.

Both radial ends 69 of piston spaces 49 are depressed to prevent adhesion of the pistons to the walls.

Figs. 5 and 7 show that when valve rod 52 has been moved by air cylinder 54 and bell crank 56 to the position shown in Fig. 7, oil under pressure in conduit 58 will flow from port 61 into the annular groove 67 formed in the bore of piston 47, then radially outwardly through channels 66 of piston 47 and out through the counterclockwise directed (Fig. 5) ports 65 into cylinder cavities 49 of gear 31. The oil pressure building up in cylinder spaces 49 back of the two ends of piston 47 presses piston 47 clockwise with respect to gear 31 and squeezes the oil in cavities 49 on the clockwise sides of piston 47 out through ports 64, channels 63 and groove 62 of piston 47, to low pressure oil tube 60 through channel 59, thus holding cam shaft 32 in its most advanced position with respect to gear 31 which has been shown above to be the required relation of cam shaft 32 to gear 31 for the engine to run as a brake with its greatest braking effect.

It should be noted that valve rod may be positioned at any position between its Fig. 7 and Fig. 8 position whereby with the fuel cut off from the engine any degree of braking effect up to the maximum obtainable in the Fig. 8 position may be had. Fig. 8 shows a midway position of rod valve 52 in which position the oil pressure will be divided equally on the two sides of piston 47 to hold the cam shaft at about half its possible advance.

A preferred method and means for positioning the valve rod 52 of this invention is seen to include in addition to the above noted parts, a modulating manually operable air supply valve 71 mounted on the engine side of instrument panel 72 of an automotive vehicle driven by the two stroke cycle engine 73. Operating lever 74 is secured to operating stem 75 extending through panel 72. Lever 74 will stay in any position set to determine the pressure of the outgoing air in line 76 up to the maximum available pressure of the air received by valve 71 through tube 77 from the available air supply.

The fuel supply throttle, not shown, of the engine is modulated by rod 78 through bell crank 79, rod 80, lever 81, link 82 and foot treadle 83 hinged at 84 to floor board 85. As is usually the case the fuel supply linkage is biased toward its no fuel position by a spring, like 86, and the fuel rate is increased as the upper end of the foot treadle 83 is depressed. On off air valve 88 connecting line 76 with line 87 is equipped with an operating lever 89 to be operated by stop 90 adjustably positioned on rod 80 to open valve 88 when treadle 83 is released to its idling fuel position.

Air actuated operator 91 is connected by its stem 92 to a fuel shut off valve substantially to stop all fuel from flowing to the engine when the foot treadle 83 is released to allow spring 86 through rod 80 and stop 90 to move lever 89 of valve 88 to pass air from line 76 to lines 87, 55 and 93 to actuate air cylinders 54 and 91 to shut off all fuel from the engine and move valve rod 52 outwardly of engine 73 to allow oil from tube 57 to move cam shaft 32 counterclockwise with respect to gear 31 to cause engine 73 to operate as a compression brake. Air cylinder 91 always operates to move stem 92 against its internal bias to shut off all fuel to the engine whenever valve 88 is opened by the release of foot treadle 83. However the amount of movement of rod valve 52 by its air cylinder operator 54 will be controlled by the air pressure in line 55 when valve 88 is opened and this air pressure will be responsive to the setting of lever 74 of modulating valve 71. The braking effect quickly applied automatically to the vehicle when the foot treadle is released will be in accordance with the position of lever 74 but at anytime when the foot treadle is released the amount of braking effect may be changed by moving lever 74.

Having recited some of the objects of this invention, illustrated and described a preferred form in which the invention may be practiced and explained its operation, I claim:

1. A two stroke cycle internal combustion engine having a main shaft, a cam shaft, an exhaust valve, an exhaust valve lifting cam on said cam shaft, a plurality of gears for synchronizing said cam shaft with said main shaft, means for supporting one of said gears on said cam shaft for relative rotation between a first position where said cam will cause said exhaust valve to be held open only during the second and third quadrants of a revolution of said main shaft and a second position where said cam will cause said exhaust valve to be held open only during the first and second quadrants of a revolution of said main shaft, said one of said gears being formed with a sector shaped space therein to form a hydraulic cylinder rotatably carried on said cam shaft, one end of said cam shaft being formed with a double acting hydraulic piston within said cylinder for relative motion about the axis of said cam shaft with respect to said one gear between said two relative positions of said one gear on said shaft, said cam shaft at said one end being formed with an axial cylindrical bore extending therein under said piston, a pair of radially extending axially spaced hydraulic conduits respectively connecting said bore with the hollow interior of said gear on the respective opposite faces of said piston, a pair of annular grooves sunk into the surface of the wall of said bore at the respective entrances of said conduits into said bore, said engine including a slide valve rod axially slidably positioned in said bore, said valve rod being formed with a pair of longitudinal hydraulic passages formed therein from the outer end thereof, one of said passages being connected by a first port to the outer surface of said rod, the other of said passages being connected to the outer surface of said rod by a pair of ports spaced on either side of said first port, said engine including a fluid sump connected with one of said passages in said slide valve rod, means for withdrawing fluid from said sump and delivering said fluid under pressure to the other of said passages in said rod, said engine including pneumatic means for adjustably positioning said valve rod axially in said bore of said cam shaft and said pneumatic means including a source of air under pressure, a first air cylinder with a first piston connected to said slide valve rod, said first piston including biasing means for biasing said valve rod toward its position of causing said engine to operate as an engine, an air conduit connecting said first cylinder to said air source to overcome said biasing means to move said air source to overcome said biasing means to move said valve rod toward its position of causing said engine to run as a brake, a foot treadle, means movable in one direction by said foot treadle to increase the rate of fuel supply to said engine and in the other direction to decrease the rate of fuel supply to an idling rate for said engine, an on-off air throttle means connected into said air conduit, said throttle means including operating means operable by said foot treadle to open said air throttle to actuate said piston against its biasing means when said foot treadle is in its fuel idling position.

2. The engine of claim 1 including a manually positionable air pressure modulating valve connected in said air conduit between said source and said cylinder for positioning said piston against its bias to predetermine the braking effect of said engine by the movement of said slide valve rod away from its full biased position when said air throttle is opened by said foot treadle movable means as said foot treadle returns to its idling position.

3. The engine of claim 2 including a fuel shut-off valve, a second air cylinder having a second piston connected to said shut-off valve biased toward the closed position of said shut-off valve and means connecting said second cylinder to said air conduit between said air throttle and said first cylinder whereby as said foot treadle reaches its idling position and said air throttle is opened said second piston will close said fuel shut-off valve.

4. In combination, a drive shaft, means for driving said shaft continuously in a desired direction of rotation from a selected first angular position thereof, a driven shaft, a hub formed on one end of said driven shaft to rotate therewith, a drive gear secured on said drive shaft to rotate therewith, a driven gear, gear means connecting said driven gear with said drive gear for rotation thereby at a constant relation therewith, means rotatably supporting said driven gear on said hub concentrically therewith and driven shaft positioning means for angularly positioning said hub with respect to said driven gear angularly to position said driven shaft in a desired angular position relative to said drive shaft, said driven shaft positioning means including means forming a hydraulic cylinder in said driven gear, means forming on said hub within said cylinder a double acting hydraulic piston for relative rotary movement in either direction about the axis of said driven shaft of said driven shaft relative to said driven gear, means forming an axial cylindrical bore into said hub extending therein under said piston, a pair of radially extending axially spaced hydraulic conduits respectively connecting said bore with said cylinder on opposite sides of said piston, a pair of annular grooves sunk into the surface of the wall of said bore at the respective entrances of said conduits into said bore, a slide valve rod axially slidably positioned in said bore and means forming a first longitudinal hydraulic passage through said rod from a first valve inlet port outside said hub to a first valve outlet port within said hub whereby said valve rod is axially positionable to open said valve outlet port alternately to said respective grooves and said respective conduits leading to said cylinder on opposite sides of said piston.

5. The combination of claim 4 including means for preventing the rotation of said valve rod while said hub of said driven shaft is rotated thereabout and said valve rod is moved axially in said hub.

6. The combination of claim 4 including means forming a second longitudinal passage through said rod from a second valve inlet port outside said hub to second and third valve outlet ports within said hub, said second and third valve outlet ports within said hub being positioned axially in said rod on opposite sides of said first valve outlet port, said second and third outlet ports each being spaced from said first outlet port the distance between said grooves whereby when said rod is moved axially to align said first outlet port with one of said grooves the other of said grooves will be open to one of said second or third outlet ports.

7. The combination of claim 6 in which said drive shaft is the main shaft of a two stroke cycle internal combustion engine, said driven shaft is the cam shaft of said engine and when fluid at a geater pressure is applied to one of said inlet ports and the other of said inlet ports is open to a space of lesser pressure said valve rod can be moved axially alternately into connection of said first outlet port with one of said grooves and the other of said grooves into connection with one of said second or third outlet ports alternately to position said driven shaft angularly with respect to said drive shaft as determined by the limits of motion of said piston with respect to said cylinder.

8. The combination of claim 7 in which the limits of motion of said piston with respect to said cylinder are the angular cam shaft positions with respect to said main shaft at which said engine runs best as an engine and runs best as a compression brake for the engine.

9. The combination of claim 4 in which said drive shaft is the main shaft of a two stroke cycle internal combustion engine and said driven shaft is the cam shaft of said engine whereby with oil under pressure applied to said first inlet port said valve rod can be moved axially alternately into connection with said respective grooves alternately to position said driven shaft angularly with respect to said drive shaft as determined by the limits of motion of said piston with respect ot said cylinder.

10. The combination of claim 9 in which the limits of motion of said piston with respect to said cylinder are the angular cam shaft positions with respect to said main shaft at which said engine runs best as an engine and best as a brake.

References Cited in the file of this patent

UNITED STATES PATENTS

| | | |
|---|---|---|
| 2,466,415 | Greenland | Apr. 5, 1949 |
| 2,521,557 | Wyckoff | Sept. 5, 1950 |
| 2,613,649 | Diebel | Oct. 14, 1952 |
| 2,708,353 | Brady | May 17, 1955 |
| 2,743,593 | Bishoff | May 1, 1956 |
| 2,765,782 | Cambeis et al. | Oct. 9, 1956 |
| 2,787,987 | Portmann | Apr. 9, 1957 |

FOREIGN PATENTS

| | | |
|---|---|---|
| 561,295 | Great Britain | May 15, 1944 |